US009036706B2

(12) United States Patent
Lou et al.

(10) Patent No.: US 9,036,706 B2
(45) Date of Patent: May 19, 2015

(54) FRACTIONAL PIXEL INTERPOLATION FILTER FOR VIDEO COMPRESSION

(75) Inventors: Jian Lou, San Diego, CA (US); Ajay Luthra, San Diego, CA (US); Koohyar Minoo, San Diego, CA (US); Krit Panusopone, San Diego, CA (US); Limin Wang, San Diego, CA (US)

(73) Assignee: GOOGLE INC., Mountain View, CA (US)

( * ) Notice: Subject to any disclaimer, the term of this patent is extended or adjusted under 35 U.S.C. 154(b) by 568 days.

(21) Appl. No.: 13/415,918

(22) Filed: Mar. 9, 2012

(65) Prior Publication Data

US 2012/0328020 A1   Dec. 27, 2012

Related U.S. Application Data

(60) Provisional application No. 61/500,010, filed on Jun. 22, 2011.

(51) Int. Cl.
*H04N 7/12* (2006.01)
*H04N 19/523* (2014.01)
*H04N 19/61* (2014.01)
*H04N 19/82* (2014.01)

(52) U.S. Cl.
CPC ............. *H04N 19/523* (2014.11); *H04N 19/61* (2014.11); *H04N 19/82* (2014.11)

(58) Field of Classification Search
CPC ..... H04N 7/50; H04N 7/26244; H04N 5/145; H04N 7/26765; H04N 7/26015; H04N 19/0063
USPC .................................................. 375/240.16
See application file for complete search history.

(56) References Cited

U.S. PATENT DOCUMENTS

2005/0105611 A1 *  5/2005  Bjontegaard ............. 375/240.01
2010/0220788 A1 *  9/2010  Wittmann et al. ....... 375/240.16

FOREIGN PATENT DOCUMENTS

WO    2006/006609 A1    1/2006
WO    2012/005558 A2    1/2012

OTHER PUBLICATIONS

Lou et.al "Motorola Mobility's Adaptive Interpolation Filter" 96. MPEG Meeting; Geneva; (Motion Picture Expert Group or ISO/IEC JTC1/SC29/WG11), No. m19888, Mar. 16, 2011, XP030048455.*
PCT Search Report and Written Opinion, Re: Application #PCT/US2012/028488; May 2, 2012.
Wedi T., et al., "Motion- and aliasing-compensated prediction for hybrid video coding" IEEE Transactions on Circuits ANS Systems for Video Technology, vol. 13, No. 7, Jul. 1, 2003.
Lou J et al., "Motorola Mobility's adaptive interpolation filter" MPEG Meeting; Geneva, Mar. 16, 2011.
Alshina et al., "CE3: 7 taps interpolation filters for quarter pel position MC from Samsung and Motorola Mobility" JCT-VC Meeting, Nov. 9, 2011.

* cited by examiner

*Primary Examiner* — Dave Czekaj
*Assistant Examiner* — Tsion B Owens
(74) *Attorney, Agent, or Firm* — Young Basile Hanlon & MacFarlane P.C.

(57) ABSTRACT

In one embodiment, a method for encoding or decoding video content is provided. The method includes receiving a plurality of full-pel pixel values. A set of coefficients is determined for an interpolation filter to interpolate a sub-pel pixel value for a motion compensation operation. Different coefficients are assigned to weight the plurality of full-pel pixel values in different operations in the interpolation filter. The sub-pel pixel values from the different operations are determined. Then, the method outputs the interpolated sub-pel pixel value for use in the motion compensation operation.

36 Claims, 5 Drawing Sheets

○ ○ ○   ○ ○ ○ ○ ○   ○ ○ ○
L3 L2 L1  L0 FL M FR R0  R1 R2 R3

FRACTIONAL PIXEL INTERPOLATION FILTER FOR VIDEO COMPRESSION

CROSS REFERENCE TO RELATED APPLICATIONS

The present application claims priority to U.S. Provisional App. No. 61/500,010 for "Low Complexity Fractional Pixel Interpolation Filter" filed Jun. 22, 2011, the contents of which is incorporated herein by reference in their entirety.

BACKGROUND

Particular embodiments generally relate to video compression.

High-efficiency video coding (HEVC) is a block-based hybrid spatial and temporal predictive coding scheme. Similar to other video coding standards, such as motion picture experts group (MPEG)-1, MPEG-2, and MPEG-4, HEVC supports intra-picture, such as I picture, and inter-picture, such as B picture. In HEVC, P and B pictures are consolidated into a general B picture that can be used as a reference picture.

Intra-picture is coded without referring to any other pictures. Thus, only spatial prediction is allowed for a coding unit (CU)/prediction unit (PU) inside an intra-picture. Inter-picture, however, supports both intra- and inter-prediction. A CU/PU in an inter-picture may be either spatially or temporally predictive coded. Temporal predictive coding may reference pictures that were previously coded.

Temporal motion prediction is an effective method to increase the coding efficiency and provides high compression. HEVC uses a translational model for motion prediction. According to the translational model, a prediction signal for a given block in a current picture is generated from a corresponding block in a reference picture. The coordinates of the reference block as given by a motion vector that describes the translational motion along horizontal (x) and vertical (y) directions that would be added/subtracted to/from the coordinates of the current block. A decoder needs the motion vector to decode the compressed video.

The pixels in the reference frame are used as the prediction. In one example, the motion may be captured in integer pixels. However, not all objects move with the spacing of integer pixels. For example, since an object motion is completely unrelated to the sampling grid, sometimes the object motion is more like a fractional-pel motion than a full-pel one. Thus, HEVC allows for motion vectors with sub-pel (fractional) pixel accuracy.

In order to estimate and compensate sub-pel displacements, the image signal on these sub-pel positions is generated by an interpolation process. In HEVC, sub-pel pixel interpolation is performed using finite impulse response (FIR) filters. Generally, the filter may have 8 taps to determine the sub-pel pixel values for sub-pel pixel positions, such as half-pel and quarter-pel positions. The taps of an interpolation filter weight the integer pixels with coefficient values to generate the sub-pel signals. Traditionally, the half-pel interpolation process uses an even number of integer pixels symmetric around a current half-pel position. The interpolation process for nearby quarter-pel or eighth-pel pixels employs the same set of integer pixels.

SUMMARY

In one embodiment, a method for encoding or decoding video content is provided. The method includes receiving a plurality of full-pel pixel values. A set of coefficients is determined for an interpolation filter to interpolate a sub-pel pixel value for a motion compensation operation. Different coefficients are assigned to weight the plurality of full-pel pixel values in different operations in the interpolation filter. The sub-pel pixel values from the different operations are determined. Then, the method outputs the interpolated sub-pel pixel value for use in the motion compensation operation.

The following detailed description and accompanying drawings provide a more detailed understanding of the nature and advantages of the present invention.

DETAILED DESCRIPTION

Described herein are techniques for a video compression system. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Overview

Figure 1:
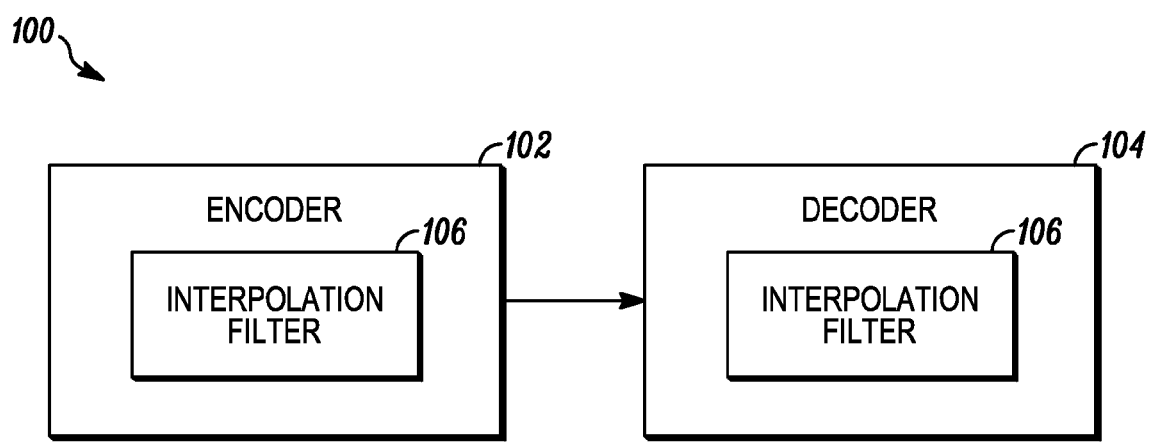
FIG. 1 depicts an example of a system for encoding and decoding video content according to one embodiment.

FIG. 1 depicts an example of a system 100 for encoding and decoding video content according to one embodiment. System 100 includes an encoder 102 and a decoder 104, both of which will be described in more detail below. Encoder 102 and decoder 104 perform temporal prediction through motion estimation. The motion prediction searches for a best match prediction for a current prediction unit (PU) over reference pictures. The best match prediction is described by a motion vector (MV) and associated reference picture ID. Also, a PU in a B picture may have up to two motion vectors.

The motion compensation allows for fractional (sub-pel) picture accuracy. Sub-pel pixel prediction is used because motion during two instances of time (the current and reference frames' capture times) can correspond to a sub-pel pixel position in pixel coordinates and generation of different prediction data corresponding to each sub-pel pixel positions allows for the possibility of conditioning the prediction signal to better match the signal in the current PU.

Encoder 102 and decoder 104 assign coefficients for an interpolation filter 106 to use to encode and decode a PU. Interpolation filters include taps that are used to determine the sub-pel pixel values for different sub-pel pixel positions, such as half-pel and quarter pel positions. The different interpolation filters may weight the taps with different values for coefficients and/or use a different number of taps. For example, for coefficient values of "0", an interpolation filter calculation using that coefficient is not necessary, as will be described in more detail below. This reduces complexity in the calculation. Also, the motion compensation may use adaptive sub-pel pixel interpolation for the PU. In this case, different interpolation filters may be used to determine the sub-pel pixel values.

Different coefficient values and/or the number of taps used produce different encoding/decoding results. Different coefficient values may be used for different types of video content. Particular embodiments select coefficient values that provide lower complexity. For example, the coefficients used require less computation and/or less data fetching.

Encoder and Decoder Examples

Figure 2A:
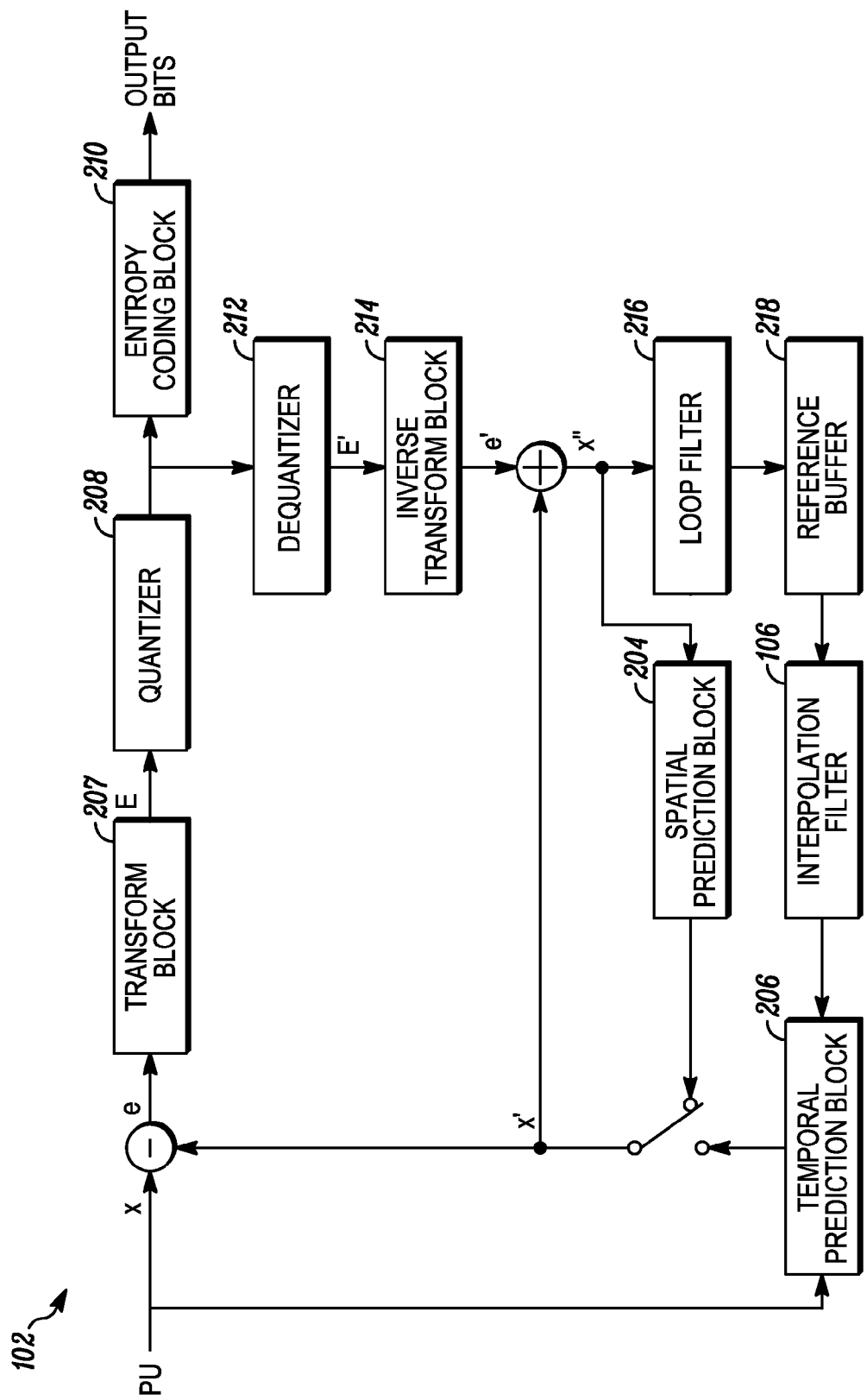
FIG. 2A depicts an example of an encoder according to one embodiment.

FIG. 2A depicts an example of an encoder 102 according to one embodiment. A general operation of encoder 102 will now be described. It will be understood that variations on the encoding process described will be appreciated by a person skilled in the art based on the disclosure and teachings herein.

For a current PU, x, a prediction PU, x', is obtained through either spatial prediction or temporal prediction. The prediction PU is then subtracted from the current PU, resulting in a residual PU, e. A spatial prediction block 204 may include different spatial prediction directions per PU, such as horizontal, vertical, 45-degree diagonal, 135-degree diagonal, DC (flat averaging), and planar.

A temporal prediction block 206 performs temporal prediction through a motion estimation and motion compensation operation. The motion estimation operation searches for a best match prediction for the current PU over reference pictures. The best match prediction is described by a motion vector (MV) and associated reference picture (refIdx). The motion vector and associated reference picture are included in the coded bit stream. In motion compensation, a best match prediction for the current PU is determined using the MV and refIdx.

Transform block 207 performs a transform operation with the residual PU, e. Transform block 207 outputs the residual PU in a transform domain, E.

A quantizer 208 then quantizes the transform coefficients of the residual PU, E. Quantizer 208 converts the transform coefficients into a finite number of possible values. Entropy coding block 210 entropy encodes the quantized coefficients, which results in final compression bits to be transmitted. Different entropy coding methods may be used, such as context-adaptive variable length coding (CAVLC) or context-adaptive binary arithmetic coding (CABAC).

Also, in a decoding process within encoder 102, a de-quantizer 212 de-quantizes the quantized transform coefficients of the residual PU. De-quantizer 212 then outputs the de-quantized transform coefficients, E'. An inverse transform block 214 receives the de-quantized transform coefficients, which are then inverse transformed resulting in a reconstructed residual PU, e'. The reconstructed PU, e', is then added to the corresponding prediction, x', either spatial or temporal, to form the new reconstructed PU, x". A loop filter 216 performs de-blocking on the reconstructed PU, x", to reduce blocking artifacts. Additionally, loop filter 216 may perform a sample adaptive offset process after the completion of the de-blocking filter process for the decoded picture, which compensates for a pixel value offset between reconstructed pixels and original pixels. Also, loop filter 216 may perform adaptive filtering over the reconstructed PU, which minimizes coding distortion between the input and output pictures. Additionally, if the reconstructed pictures are reference pictures, the reference pictures are stored in a reference buffer 218 for future temporal prediction.

Interpolation filter 106 interpolates sub-pel pixel values for temporal prediction block 206. Temporal prediction block 206 uses the sub-pel pixel values to generate a prediction of a current PU.

Figure 2B:
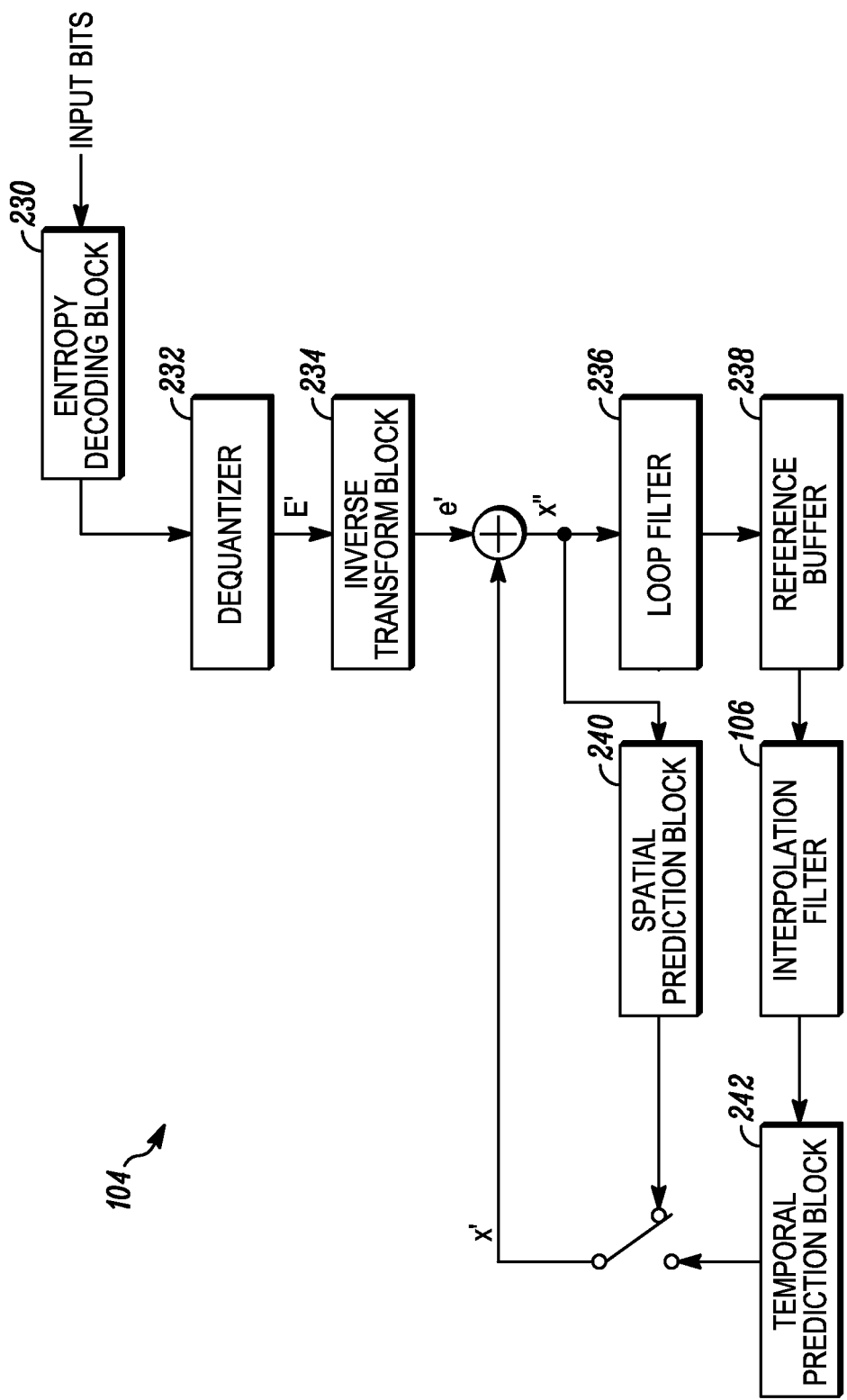
FIG. 2B depicts an example of a decoder according to one embodiment.

FIG. 2B depicts an example of decoder 104 according to one embodiment. A general operation of decoder 104 will now be described. It will be understood that variations on the decoding process described will be appreciated by a person skilled in the art based on the disclosure and teachings herein. Decoder 104 receives input bits from encoder 102 for compressed video content.

An entropy decoding block 230 performs entropy decoding on input bits corresponding to quantized transform coefficients of a residual PU. A de-quantizer 232 de-quantizes the quantized transform coefficients of the residual PU. De-quantizer 232 then outputs the de-quantized transform coefficients of the residual PU, E'. An inverse transform block 234 receives the de-quantized transform coefficients, which are then inverse transformed resulting in a reconstructed residual PU, e'.

The reconstructed PU, e', is then added to the corresponding prediction, x', either spatial or temporal, to form the new constructed PU, x". A loop filter 236 performs de-blocking on the reconstructed PU, x", to reduce blocking artifacts. Additionally, loop filter 236 may perform a sample adaptive offset process after the completion of the de-blocking filter process for the decoded picture, which compensates for a pixel value offset between reconstructed pixels and original pixels. Also, loop filter 236 may perform an adaptive loop filter over the reconstructed PU, which minimizes coding distortion between the input and output pictures. Additionally, if the reconstructed pictures are reference pictures, the reference pictures are stored in a reference buffer 238 for future temporal prediction.

The prediction PU, x', is obtained through either spatial prediction or temporal prediction. A spatial prediction block 240 may receive decoded spatial prediction directions per PU, such as horizontal, vertical, 45-degree diagonal, 135-degree diagonal, DC (flat averaging), and planar. The spatial prediction directions are used to determine the prediction PU, x'.

Interpolation filter 106 interpolates sub-pel pixel values for input into a temporal prediction block 242. Temporal prediction block 242 performs temporal prediction through a motion estimation and motion compensation operation. A decoded motion vector or a motion vector derived from other motion information is then used to determine the prediction PU, x'.

Interpolation Filter Selection

Figures 3, 4:
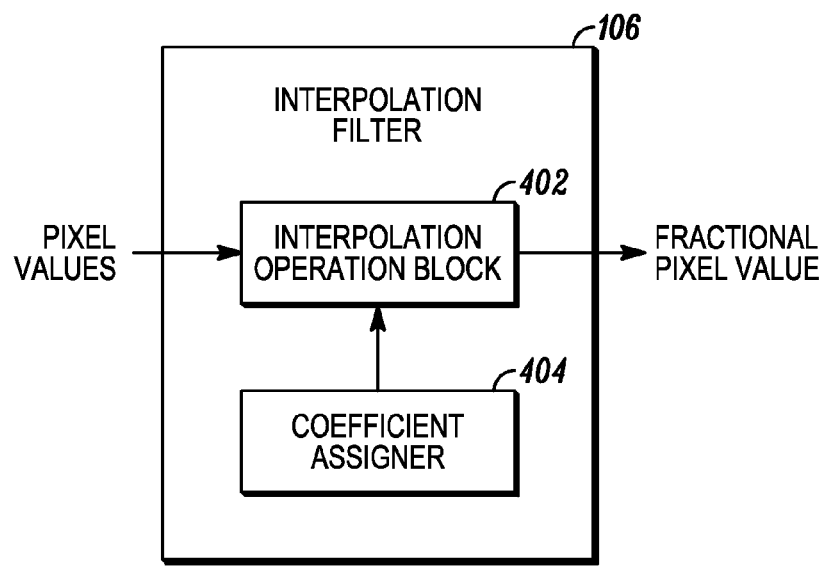
FIG. 3 depicts positions of half-pel and quarter-pel pixels between full-pel pixels along a pixel line within an image according to one embodiment.
FIG. 4 shows an example of an interpolation filter according to one embodiment.

To estimate a fractional pixel (sub-pel displacements), an image signal on each sub-pel position is generated by an interpolation process. The interpolation process can be used for motion estimation and motion compensation. FIG. 3 depicts positions of half-pel and quarter-pel pixels between full-pel pixels along a pixel line within an image according to one embodiment. For example, the pixel line may be along a row or column on an image. Multiple interpolation calculations may be made along different rows and columns of an image. Full-pel pixels are represented by integer pixels and are shown in FIG. 3 as pixels L3, L2, L1, L0, R0, R1, R2, and R3. H is a half-pel pixel between full-pel pixels L0 and R0. FL is a sub-pel pixel (quarter-pel pixel) between full-pel pixels L0 and H and FR is a sub-pel pixel between half-pel pixel H and full-pel pixel R0.

The quarter-pel and half-pel pixels may be interpolated using the values of spatial neighboring full-pel pixels. For example, the half-pel pixel H may be interpolated using the values of full-pel pixels L3, L2, L1, L0, R0, R1, R2, and R3. Different coefficients may also be used to weight the values of the neighboring pixels and provide different characteristics of filtering.

FIG. 4 shows an example of an interpolation filter 106 according to one embodiment. Interpolation filter 106 receives full-pel pixel values. For example, the values of full-pel pixels L3, L2, L1, L0, R0, R1, R2, and R3 are received. Coefficient assigner 404 assigns coefficients to weight the full-pel pixel values. In one embodiment, the coefficient values may be static. For example, for each interpolation for a sub-pel position, the same coefficient values are used. In other embodiments, the coefficient values are determined adaptively. Also, different coefficient values may be used to interpolate different sub-pel pixel positions. For example, interpolation of half-pel positions uses different coefficient values than interpolation of quarter-pel positions.

An interpolation operation block 402 performs an interpolation operation to determine a sub-pel pixel value. Different coefficients are used for different sub-pel positions. The same operation may be used to calculate the sub-pel pixel value; however, different operations may be used and contemplated.

One example of a calculation is:

$$H=(0*L3+2*L2-9*L1+39*L0+39*R0-9*R1+2*R2+0*R3+32)>>6;$$

The half-pel position (H) is calculated by applying coefficient values to the full-pel pixel values (L3, L2, L1, L0, R0, R1, R2, and R3). For example, a full-pel pixel value is multiplied by a corresponding coefficient value. Then, the results of the multiplied values are added together. A value of "32" is added and the result is right shifted by "6". The adding of "32" and shifting to the right (6 bits) is equivalent to adding 32 and dividing by 64, which truncates the value. Other operations are also contemplated. For example, interpolation operation block 402 may apply the coefficients to different full-pel pixel values (e.g., one coefficient value to multiple full-pel values or multiple coefficient values to one full-pel value, etc.) or a different truncating operation may be performed.

In some cases, the coefficient value used may be "0". In one embodiment, interpolation operation block 402 may not use that coefficient in the calculation. In the example above, two coefficient values are 0, and a 6 tap interpolation filter may be used. This saves two computations as (0*L3) and (0*R3) do not need to be performed. In other embodiments, the 0 value may be used in the calculation.

Figure 5:
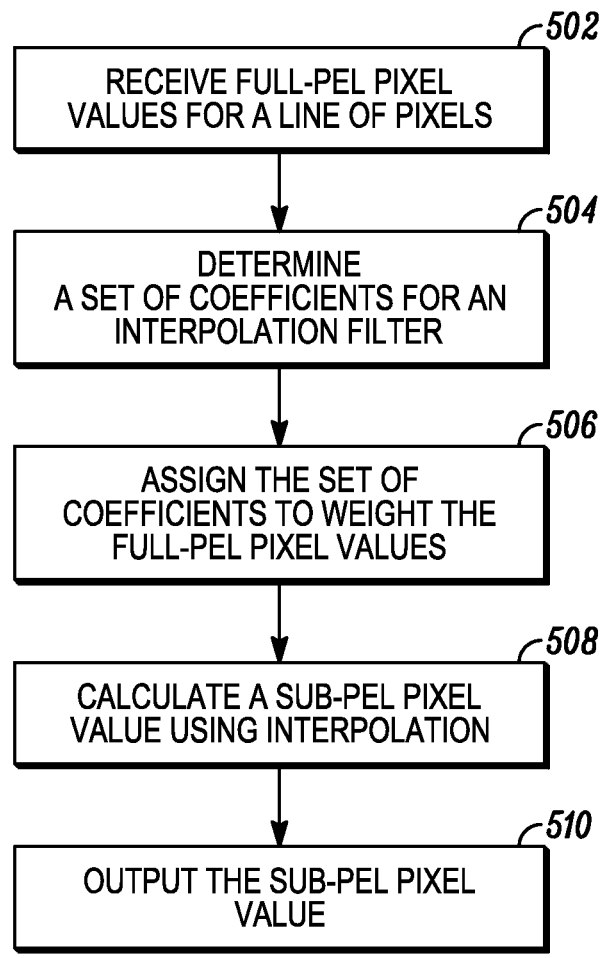
FIG. 5 depicts a simplified flowchart for a method interpolating sub-pel pixel values according to one embodiment.

FIG. 5 depicts a simplified flowchart 500 for a method interpolating sub-pel pixel values according to one embodiment. At 502, interpolation filter 106 receives full-pel pixel values for a line of pixels. For example, encoder 102 receives full-pel pixel values for encoding a PU or decoder 104 receives full-pel pixel values for decoding compressed bits.

At 504, coefficient assigner 404 determines a set of coefficients for an interpolation filter 106 to interpolate a sub-pel pixel value for a motion compensation operation. In one example, the coefficients for interpolation filter 106 are fixed and applicable to compression of all sequences for a sub-pel position. In another example, interpolation filter 106 choice may vary from sequence to sequence, within a sequence, from picture to picture, from reference to reference, or within a picture, from PU to PU. This is referred to as an adaptive interpolation filter (AIF). To use an adaptive interpolation filter, the choice of which adaptive filter needs to be communicated to the decoder explicitly or implicitly derived. In the explicit signaling, encoder 102 may send the filter coefficients or send information indicating the preferred filter to be used. In implicitly deriving the coefficients, information already known to encoder 102 or decoder 104 may be used to determine the coefficients to use.

At 506, coefficient assigner 404 assigns the set of coefficients to weight full-pel pixel values. For example, each coefficient is assigned to a full-pel pixel value. By determining coefficients with zero values, the complexity can be reduced. When zero coefficient values are not used in the operation, the full-pel pixel values that correspond to non-zero coefficient values need to be determined This ensures that a full-pel pixel value that corresponds to the zero coefficient is not used in the interpolation calculation. Coefficient assigner 404 may signal which full-pel pixel value corresponds to a zero value (e.g., the R3 position).

At 508, interpolation operation block 402 calculates an interpolated sub-pel pixel value using the coefficient values and the full-pel pixel values. At 510, interpolation filter 106 outputs the interpolated sub-pel pixel value.

Two different sets of coefficient values will be described, but others may be used. For example, in Table 2 below the following coefficient values are used:

$$QL=(-1*L3+4*L2-10*L1+58*L0+17*R0-5*R1+1*R2+0*R3+32)>>6.$$

$$QR=(0*L3+1*L2-5*L1+17*L0+58*R0-10*R1+4*R2-1*R3+32)>>6. \quad \text{Example Q.1}$$

$$QL=(-1*L3+3*L2-8*L1+60*L0+13*R0-4*R1+1*R2+0*R3+32)>>6.$$

$$QR=(0*L3+1*L2-4*L1+13*L0+60*R0-8*R1+3*R2-1*R3+32)>>6. \quad \text{Example Q.7}$$

These two examples require less taps to be used, which reduces complexity. For example, interpolation filter 106 includes seven taps because full-pel pixel values for either the L3 sub-pel position or the R3 sub-pel pixel position may be omitted from the calculation. Less data fetching and computation is needed because less full-pel values need to be fetched and used in the calculation. Also, resulting performance of interpolation filter 106 is improved using these coefficients.

The following describes different coefficient values that may be used. The different filters differ in their frequency responses and lengths, and so it is expected that compression performance and complexity will differ among the filters. It will be understood that scaling of the values for a given filter may be used. For example, the values may be doubled, the operations performed, and the result scaled down by half. A person of skill in the art will appreciate equivalents in scaling of the values.

Half Pixel Interpolation Filters (H)

In one embodiment, the half-pel pixel, H, is interpolated using the values of spatial neighboring full-pel pixels, L3, L2, L1, L0, R0, R1, R2, and R3, as follows:

$$H=(0*L3+2*L2-9*L1+39*L0+39*R0-9*R1+2*R2+0*R3+32)>>6; \quad \text{Example H.1}$$

$$H=(0*L3+1*L2-7*L1+38*L0+38*R0-7*R1+1*R2+0*R3+32)>>6; \quad \text{Example H.2}$$

Here, multiplication with filter coefficient of zero is given for the sake of completeness. However, in an implementation it is not necessary to perform the operation, and the complexity can be reduced.

Table 1 summarizes the filter coefficients.

TABLE 1

Low complexity half pixel interpolation filter coefficients

| | Coefficients |
|---|---|
| Example H.1 | {0, 2, −9, 39, 39, −9, 2, 0} |
| Example H.2 | {0, 1, −7, 38, 38, −7, 1, 0} |

Quarter Pixel Interpolation Filters (Q)

In another embodiment, the quarter-pel pixels, QL and QR are interpolated using the values of spatial neighboring full-pel pixels, L3, L2, L1, L0, R0, R1, R2 and R3, as follows $QL=(-1*L3+4*L2-10*L1+58*L0+17*R0-5*R1+1*R2+0*R3+32)>>6;$ $QR=(0*L3+1*L2-5*L1+17*L0+58*R0-10*R1+4*R2-1*R3+32)>>6;$     Example Q.1

$QL=(-1*L3+3*L2-9*L1+58*L0+18*R0-7*R1+2*R2+0*R3+32)>>6;$ $QR=(0*L3+2*L2-7*L1+18*L0+58*R0-9*R1+3*R2-1*R3+32)>>6;$     Example Q.2

$QL=(-1*L3+3*L2-9*L1+57*L0+19*R0-7*R1+2*R2+0*R3+32)>>6;$ $QR=(0*L3+2*L2-7*L1+19*L0+57*R0-9*R1+3*R2-1*R3+32)>>6;$     Example Q.3

$QL=(-1*L3+3*L2-9*L1+57*L0+18*R0-6*R1+2*R2+0*R3+32)>>6;$ $QR=(0*L3+2*L2-6*L1+18*L0+57*R0-9*R1+3*R2-1*R3+32)>>6;$     Example Q.4

$QL=(0*L3+1*L2-6*L1+59*L0+13*R0-4*R1+1*R2+0*R3+32)>>6;$ $QR=(0*L3+1*L2-4*L1+13*L0+59*R0-6*R1+1*R2+0*R3+32)>>6;$     Example Q.5

$QL=(0*L3+2*L2-7*L1+58*L0+15*R0-5*R1+1*R2+0*R3+32)>>6;$ $QR=(0*L3+1*L2-5*L1+15*L0+58*R0-7*R1+2*R2+0*R3+32)>>6;$     Example Q.6

$QL=(-1*L3+3*L2-8*L1+60*L0+13*R0-4*R1+1*R2+0*R3+32)>>6;$ $QR=(0*L3+1*L2-4*L1+13*L0+60*R0-8*R1+3*R2-1*R3+32)>>6;$     Example Q.7

Here, multiplication with filter coefficient of zero is given for the sake of completeness. However, in an implementation it is not necessary to perform the operation, and the complexity can be reduced.

Table 2 summarizes the filter coefficients.

TABLE 2

Quarter pixel interpolation filter coefficients

| | Position | Coefficients |
|---|---|---|
| Example Q.1 | ¼ | {−1, 4, −10, 58, 17, −5, 1, 0} |
| | ¾ | {0, 1, −5, 17, 58, −10, 4, −1} |
| Example Q.2 | ¼ | {−1, 3, −9, 58, 18, −7, 2, 0} |
| | ¾ | {0, 2, −7, 18, 58, −9, 3, −1} |

TABLE 2-continued

Quarter pixel interpolation filter coefficients

| | Position | Coefficients |
|---|---|---|
| Example Q.3 | ¼ | {−1, 3, −9, 57, 19, −7, 2, 0} |
| | ¾ | {0, 2, −7, 19, 57, −9, 3, −1} |
| Example Q.4 | ¼ | {−1, 3, −9, 57, 18, −6, 2, 0} |
| | ¾ | {0, 2, −6, 18, 57, −9, 3, −1} |
| Example Q.5 | ¼ | {0, 1, −6, 59, 13, −4, 1, 0} |
| | ¾ | {0, 1, −4, 13, 59, −6, 1, 0} |
| Example Q.6 | ¼ | {0, 2, −7, 58, 15, −5, 1, 0} |
| | ¾ | {0, 1, −5, 15, 58, −7, 2, 0} |
| Example Q.7 | ¼ | {−1, 3, −8, 60, 13, −4, 1, 0} |
| | ¾ | {0, 1, −4, 13, 60, −8, 3, −1} |

Combination of Half Pixel and Quarter Pixel Interpolation Filters (HQ)

In another embodiment, the half pel pixel H and quarter-pel pixel QL and QR are interpolated using the values of spatial neighboring full-pel pixels, L3, L2, L1, L0, R0, R1, R2 and R3, as follows:

$QL=(-1*L3+4*L2-10*L1+57*L0+19*R0-7*R1+3*R2-1*R3+32)>>6;$ $H=(0*L3+2*L2-9*L1+39*L0+39*R0-9*R1+2*R2+0*R3+32)>>6;$ $QR=(-1*L3+3*L2-7*L1+19*L0+57*R0-10*R1+4*R2-1*R3+32)>>6;$     Example HQ.1

$QL=(-1*L3+4*L2-10*L1+58*L0+17*R0-5*R1+1*R2+0*R3+32)>>6;$ $H=(0*L3+2*L2-9*L1+39*L0+39*R0-9*R1+2*R2+0*R3+32)>>6;$ $QR=(0*L3+1*L2-5*L1+17*L0+58*R0-10*R1+4*R2-1*R3+32)>>6;$     Example HQ.2

$QL=(-1*L3+3*L2-9*L1+58*L0+18*R0-7*R1+2*R2+0*R3+32)>>6;$ $H=(0*L3+2*L2-9*L1+39*L0+39*R0-9*R1+2*R2+0*R3+32)>>6;$ $QR=(0*L3+2*L2-7*L1+18*L0+58*R0-9*R1+3*R2-1*R3+32)>>6;$     Example HQ.3

$QL=(-1*L3+3*L2-9*L1+57*L0+19*R0-7*R1+2*R2+0*R3+32)>>6;$ $H=(0*L3+2*L2-9*L1+39*L0+39*R0-9*R1+2*R2+0*R3+32)>>6;$ $QR=(0*L3+2*L2-7*L1+19*L0+57*R0-9*R1+3*R2-1*R3+32)>>6;$     Example HQ.4

$QL=(-1*L3+3*L2-9*L1+57*L0+18*R0-6*R1+2*R2+0*R3+32)>>6;$ $H=(0*L3+1*L2-7*L1+38*L0+38*R0-7*R1+1*R2+0*R3+32)>>6;$ $QR=(0*L3+2*L2-6*L1+18*L0+57*R0-9*R1+3*R2-1*R3+32)>>6;$     Example HQ.5

$QL=(0*L3+1*L2-6*L1+59*L0+13*R0-4*R1+1*R2+0*R3+32)>>6;$ $H=(0*L3+2*L2-9*L1+39*L0+39*R0-9*R1+2*R2+0*R3+32)>>6;$ $QR=(0*L3+1*L2-4*L1+13*L0+59*R0-6*R1+1*R2+0*R3+32)>>6;$     Example HQ.6

$QL=(0*L3+2*L2-7*L1+58*L0+15*R0-5*R1+1*R2+0*R3+32)>>6;$ $H=(0*L3+2*L2-9*L1+39*L0+39*R0-9*R1+2*R2+0*R3+32)>>6;$ $QR=(0*L3+1*L2-5*L1+15*L0+58*R0-7*R1+2*R2+0*R3+32)>>6;$   Example HQ.7

$QL=(-1*L3+3*L2-8*L1+60*L0+13*R0-4*R1+1*R2+0*R3+32)>>6;$ $H=(0*L3+2*L2-9*L1+39*L0+39*R0-9*R1+2*R2+0*R3+32)>>6;$ $QR=(0*L3+1*L2-4*L1+13*L0+60*R0-8*R1+3*R2-1*R3+32)>>6;$   Example HQ.8

$QL=(-1*L3+3*L2-8*L1+60*L0+13*R0-4*R1+1*R2+0*R3+32)>>6;$ $H=(-1*L3+4*L2-11*L1+40*L0+40*R0-11*R1+4*R2-1*R3+32)>>6;$ $QR=(0*L3+1*L2-4*L1+13*L0+60*R0-8*R1+3*R2-1*R3+32)>>6;$   Example HQ.9

Here, multiplication with filter coefficient of zero is given for the sake of completeness. However, in an implementation it is not necessary to perform the operation, and the complexity can be reduced.

Table 3 summarizes the filter coefficients.

TABLE 3

Combination of half pixel and quarter pixel interpolation filter coefficients

| | Position | Coefficients |
|---|---|---|
| Example HQ.1 | ¼ | {−1, 4, −10, 57, 19, −7, 3, −1} |
| | ½ | {0, 2, −9, 39, 39, −9, 2, 0} |
| | ¾ | {−1, 3, −7, 19, 57, −10, 4, −1} |
| Example HQ.2 | ¼ | {−1, 4, −10, 58, 17, −5, 1, 0} |
| | ½ | {0, 2, −9, 39, 39, −9, 2, 0} |
| | ¾ | {0, 1, −5, 17, 58, −10, 4, −1} |
| Example HQ.3 | ¼ | {−1, 3, −9, 58, 18, −7, 2, 0} |
| | ½ | {0, 2, −9, 39, 39, −9, 2, 0} |
| | ¾ | {0, 2, −7, 18, 58, −9, 3, −1} |
| Example HQ.4 | ¼ | {−1, 3, −9, 57, 19, −7, 2, 0} |
| | ½ | {0, 2, −9, 39, 39, −9, 2, 0} |
| | ¾ | {0, 2, −7, 19, 57, −9, 3, −1} |
| Example HQ.5 | ¼ | {−1, 3, −9, 57, 18, −6, 2, 0} |
| | ½ | {0, 1, −7, 38, 38, −7, 1, 0} |
| | ¾ | {0, 2, −6, 18, 57, −9, 3, −1} |
| Example HQ.6 | ¼ | {0, 1, −6, 59, 13, −4, 1, 0} |
| | ½ | {0, 2, −9, 39, 39, −9, 2, 0} |
| | ¾ | {0, 1, −4, 13, 59, −6, 1, 0} |
| Example HQ.7 | ¼ | {0, 2, −7, 58, 15, −5, 1, 0} |
| | ½ | {0, 2, −9, 39, 39, −9, 2, 0} |
| | ¾ | {0, 1, −5, 15, 58, −7, 2, 0} |
| Example HQ.8 | ¼ | {−1, 3, −8, 60, 13, −4, 1, 0} |
| | ½ | {0, 2, −9, 39, 39, −9, 2, 0} |
| | ¾ | {0, 1, −4, 13, 60, −8, 3, −1} |
| Example HQ.9 | ¼ | {−1, 3, −8, 60, 13, −4, 1, 0} |
| | ½ | {−1, 4, −11, 40, 40, −11, 4, −1} |
| | ¾ | {0, 1, −4, 13, 60, −8, 3, −1} |

Additional Half Pixel Interpolation Filters (MH)

Some additional half pixel interpolation filters that differ in passband and stopband frequency response are given in Table 4. Some of the coefficients in these filters are zero coefficients and can be suitable in cases where low computation complexity is required.

TABLE 4

Additional half pixel interpolation filter coefficients

| | Coefficients |
|---|---|
| Example MH.1 | {0, 1, −8, 39, 39, −8, 1, 0} |
| Example MH.2 | {0, 2, −8, 38, 38, −8, 2, 0} |
| Example MH.3 | {0, 2, −10, 40, 40, −10, 2, 0} |
| Example MH.4 | {0, 3, −10, 39, 39, −10, 3, 0} |
| Example MH.5 | {0, 3, −11, 40, 40, −11, 3, 0} |
| Example MH.6 | {0, 3, −12, 41, 41, −12, 3, 0} |
| Example MH.7 | {0, 3, −13, 42, 42, −13, 3, 0} |
| Example MH.8 | {0, 0, −5, 37, 37, −5, 0, 0} |
| Example MH.9 | {0, 0, −6, 38, 38, −6, 0, 0} |
| Example MH.10 | {0, 0, −7, 39, 39, −7, 0, 0} |

Additional Quarter Pixel Interpolation Filters (MQ)

Some additional quarter pixel interpolation filters that differ in passband and stopband frequency response are given in Table 5 (The filter coefficients for position ¾ are the reflections of those for position ¼). Some of the coefficients in these filters are zero coefficients and can be suitable in cases where low computation complexity is required.

TABLE 5

Additional quarter pixel interpolation filter coefficients for position ¼

| | Coefficients |
|---|---|
| Example MQ.1 | {−1, 2, −8, 57, 17, −5, 2, 0} |
| Example MQ.2 | {−1, 2, −10, 57, 18, −4, 2, 0} |
| Example MQ.3 | {−1, 3, −8, 55, 20, −7, 2, 0} |
| Example MQ.4 | {−1, 3, −9, 53, 23, −7, 2, 0} |
| Example MQ.5 | {−1, 3, −9, 56, 19, −6, 2, 0} |
| Example MQ.6 | {−1, 3, −9, 56, 20, −7, 2, 0} |
| Example MQ.7 | {−1, 3, −9, 57, 20, −8, 2, 0} |
| Example MQ.8 | {−1, 3, −9, 58, 19, −8, 2, 0} |
| Example MQ.9 | {−1, 3, −10, 56, 20, −6, 2, 0} |
| Example MQ.10 | {−1, 3, −10, 57, 19, −6, 2, 0} |
| Example MQ.11 | {−1, 3, −10, 57, 20, −7, 2, 0} |
| Example MQ.12 | {−1, 3, −10, 58, 18, −6, 2, 0} |
| Example MQ.13 | {−1, 3, −10, 58, 19, −7, 2, 0} |
| Example MQ.14 | {−1, 3, −10, 58, 20, −8, 2, 0} |
| Example MQ.15 | {−1, 3, −11, 57, 20, −6, 2, 0} |
| Example MQ.16 | {−1, 3, −11, 58, 19, −6, 2, 0} |
| Example MQ.17 | {−1, 3, −11, 58, 20, −7, 2, 0} |
| Example MQ.18 | {−1, 4, −9, 56, 18, −6, 2, 0} |
| Example MQ.19 | {−1, 4, −9, 56, 18, −7, 3, 0} |
| Example MQ.20 | {−1, 4, −9, 56, 19, −7, 2, 0} |
| Example MQ.21 | {−1, 4, −9, 56, 19, −8, 3, 0} |
| Example MQ.22 | {−1, 4, −9, 56, 20, −8, 2, 0} |
| Example MQ.23 | {−1, 4, −9, 57, 18, −7, 2, 0} |
| Example MQ.24 | {−1, 4, −9, 57, 18, −8, 3, 0} |
| Example MQ.25 | {−1, 4, −9, 57, 19, −8, 2, 0} |
| Example MQ.26 | {−1, 4, −9, 58, 18, −8, 2, 0} |
| Example MQ.27 | {−1, 4, −10, 56, 18, −6, 3, 0} |
| Example MQ.28 | {−1, 4, −10, 56, 19, −6, 2, 0} |
| Example MQ.29 | {−1, 4, −10, 56, 19, −7, 3, 0} |
| Example MQ.30 | {−1, 4, −10, 56, 20, −7, 2, 0} |
| Example MQ.31 | {−1, 4, −10, 56, 20, −8, 3, 0} |
| Example MQ.32 | {−1, 4, −10, 57, 18, −6, 2, 0} |
| Example MQ.33 | {−1, 4, −10, 57, 18, −7, 3, 0} |
| Example MQ.34 | {−1, 4, −10, 57, 19, −7, 2, 0} |
| Example MQ.35 | {−1, 4, −10, 57, 19, −8, 3, 0} |
| Example MQ.36 | {−1, 4, −10, 57, 20, −8, 2, 0} |
| Example MQ.37 | {−1, 4, −10, 58, 18, −7, 2, 0} |
| Example MQ.38 | {−1, 4, −10, 58, 18, −8, 3, 0} |
| Example MQ.39 | {−1, 4, −10, 58, 19, −8, 2, 0} |
| Example MQ.40 | {−1, 4, −11, 56, 19, −6, 3, 0} |
| Example MQ.41 | {−1, 4, −11, 56, 20, −5, 1, 0} |
| Example MQ.42 | {−1, 4, −11, 56, 20, −6, 2, 0} |
| Example MQ.43 | {−1, 4, −11, 56, 20, −7, 3, 0} |
| Example MQ.44 | {−1, 4, −11, 57, 18, −6, 3, 0} |
| Example MQ.45 | {−1, 4, −11, 57, 19, −6, 2, 0} |
| Example MQ.46 | {−1, 4, −11, 57, 19, −7, 3, 0} |
| Example MQ.47 | {−1, 4, −11, 57, 20, −7, 2, 0} |
| Example MQ.48 | {−1, 4, −11, 57, 20, −8, 3, 0} |

TABLE 5-continued

Additional quarter pixel interpolation filter coefficients for position ¼

| | Coefficients |
|---|---|
| Example MQ.49 | {−1, 4, −11, 58, 18, −6, 2, 0} |
| Example MQ.50 | {−1, 4, −11, 58, 18, −7, 3, 0} |
| Example MQ.51 | {−1, 4, −11, 58, 19, −7, 2, 0} |
| Example MQ.52 | {−1, 4, −11, 58, 19, −8, 3, 0} |
| Example MQ.53 | {−1, 4, −11, 58, 20, −8, 2, 0} |
| Example MQ.54 | {−1, 4, −11, 59, 16, −4, 1, 0} |
| Example MQ.55 | {−1, 4, −13, 55, 22, −4, 1, 0} |
| Example MQ.56 | {−1, 5, −9, 54, 22, −8, 1, 0} |
| Example MQ.57 | {−1, 5, −9, 56, 18, −7, 2, 0} |
| Example MQ.58 | {−1, 5, −9, 56, 18, −8, 3, 0} |
| Example MQ.59 | {−1, 5, −9, 56, 19, −8, 2, 0} |
| Example MQ.60 | {−1, 5, −9, 57, 18, −8, 2, 0} |
| Example MQ.61 | {−1, 5, −10, 56, 18, −6, 2, 0} |
| Example MQ.62 | {−1, 5, −10, 56, 18, −7, 3, 0} |
| Example MQ.63 | {−1, 5, −10, 56, 19, −7, 2, 0} |
| Example MQ.64 | {−1, 5, −10, 56, 19, −8, 3, 0} |
| Example MQ.65 | {−1, 5, −10, 56, 20, −8, 2, 0} |
| Example MQ.66 | {−1, 5, −10, 57, 18, −7, 2, 0} |
| Example MQ.67 | {−1, 5, −10, 57, 19, −8, 2, 0} |
| Example MQ.68 | {−1, 5, −10, 58, 18, −8, 2, 0} |
| Example MQ.69 | {−1, 5, −11, 56, 18, −6, 3, 0} |
| Example MQ.70 | {−1, 5, −11, 56, 19, −6, 2, 0} |
| Example MQ.71 | {−1, 5, −11, 56, 19, −7, 3, 0} |
| Example MQ.72 | {−1, 5, −11, 56, 20, −7, 2, 0} |
| Example MQ.73 | {−1, 5, −11, 56, 20, −8, 3, 0} |
| Example MQ.74 | {−1, 5, −11, 57, 18, −6, 2, 0} |
| Example MQ.75 | {−1, 5, −11, 57, 18, −7, 3, 0} |
| Example MQ.76 | {−1, 5, −11, 57, 19, −7, 2, 0} |
| Example MQ.77 | {−1, 5, −11, 57, 19, −8, 3, 0} |
| Example MQ.78 | {−1, 5, −11, 57, 20, −8, 2, 0} |
| Example MQ.79 | {−1, 5, −11, 58, 18, −7, 2, 0} |
| Example MQ.80 | {−1, 5, −11, 58, 18, −8, 3, 0} |
| Example MQ.81 | {−1, 5, −11, 58, 19, −8, 2, 0} |
| Example MQ.82 | {−2, 6, −10, 62, 14, −7, 1, 0} |
| Example MQ.83 | {0, 1, −5, 59, 12, −4, 1, 0} |
| Example MQ.84 | {0, 1, −6, 55, 18, −5, 1, 0} |
| Example MQ.85 | {0, 1, −6, 56, 17, −5, 1, 0} |
| Example MQ.86 | {0, 1, −6, 58, 14, −4, 1, 0} |
| Example MQ.87 | {0, 1, −7, 54, 20, −5, 1, 0} |
| Example MQ.88 | {0, 1, −7, 55, 19, −5, 1, 0} |
| Example MQ.89 | {0, 1, −7, 57, 16, −4, 1, 0} |
| Example MQ.90 | {0, 1, −7, 58, 15, −4, 1, 0} |
| Example MQ.91 | {0, 1, −7, 60, 12, −3, 1, 0} |
| Example MQ.92 | {0, 1, −8, 55, 19, −4, 1, 0} |
| Example MQ.93 | {0, 1, −8, 56, 18, −4, 1, 0} |
| Example MQ.94 | {0, 1, −8, 56, 19, −6, 2, 0} |
| Example MQ.95 | {0, 1, −8, 58, 15, −3, 1, 0} |
| Example MQ.96 | {0, 1, −8, 59, 14, −3, 1, 0} |
| Example MQ.97 | {0, 1, −9, 56, 18, −3, 1, 0} |
| Example MQ.98 | {0, 1, −9, 57, 17, −3, 1, 0} |
| Example MQ.99 | {0, 1, −9, 58, 16, −3, 1, 0} |
| Example MQ.100 | {0, 1, −10, 55, 20, −3, 1, 0} |
| Example MQ.101 | {0, 1, −10, 56, 19, −3, 1, 0} |
| Example MQ.102 | {0, 1, −10, 58, 16, −2, 1, 0} |
| Example MQ.103 | {0, 1, −10, 59, 15, −2, 1, 0} |
| Example MQ.104 | {0, 1, −11, 55, 20, −2, 1, 0} |
| Example MQ.105 | {0, 1, −11, 56, 19, −2, 1, 0} |
| Example MQ.106 | {0, 1, −11, 57, 18, −2, 1, 0} |
| Example MQ.107 | {0, 2, −6, 59, 13, −5, 1, 0} |
| Example MQ.108 | {0, 2, −7, 54, 20, −6, 1, 0} |
| Example MQ.109 | {0, 2, −7, 55, 19, −6, 1, 0} |
| Example MQ.110 | {0, 2, −7, 56, 18, −6, 1, 0} |
| Example MQ.111 | {0, 2, −8, 56, 18, −5, 1, 0} |
| Example MQ.112 | {0, 2, −8, 57, 17, −5, 1, 0} |
| Example MQ.113 | {0, 2, −8, 58, 16, −6, 2, 0} |
| Example MQ.114 | {0, 2, −9, 52, 24, −6, 1, 0} |
| Example MQ.115 | {0, 2, −9, 55, 20, −5, 1, 0} |
| Example MQ.116 | {0, 2, −9, 57, 18, −6, 2, 0} |
| Example MQ.117 | {0, 3, −9, 56, 18, −6, 2, 0} |
| Example MQ.118 | {0, 3, −10, 56, 20, −7, 2, 0} |
| Example MQ.119 | {0, 3, −10, 57, 19, −7, 2, 0} |
| Example MQ.120 | {0, 0, −6, 53, 22, −9, 4, 0} |
| Example MQ.121 | {0, 1, −5, 58, 13, −3, 0, 0} |
| Example MQ.122 | {0, 1, −6, 59, 12, −2, 0, 0} |
| Example MQ.123 | {0, 1, −7, 58, 14, −2, 0, 0} |
| Example MQ.124 | {0, 1, −7, 59, 13, −2, 0, 0} |
| Example MQ.125 | {0, 1, −8, 57, 16, −2, 0, 0} |
| Example MQ.126 | {0, 1, −8, 58, 15, −2, 0, 0} |
| Example MQ.127 | {0, 2, −5, 58, 13, −4, 0, 0} |
| Example MQ.128 | {0, 2, −5, 59, 12, −4, 0, 0} |
| Example MQ.129 | {0, 2, −6, 55, 18, −5, 0, 0} |
| Example MQ.130 | {0, 2, −6, 57, 15, −4, 0, 0} |
| Example MQ.131 | {0, 2, −6, 58, 14, −4, 0, 0} |
| Example MQ.132 | {0, 2, −7, 54, 20, −5, 0, 0} |
| Example MQ.133 | {0, 2, −7, 56, 17, −4, 0, 0} |
| Example MQ.134 | {0, 2, −7, 57, 16, −4, 0, 0} |
| Example MQ.135 | {0, 2, −7, 59, 13, −3, 0, 0} |
| Example MQ.136 | {0, 2, −7, 60, 12, −3, 0, 0} |
| Example MQ.137 | {0, 2, −8, 54, 20, −4, 0, 0} |
| Example MQ.138 | {0, 2, −8, 55, 19, −4, 0, 0} |
| Example MQ.139 | {0, 2, −8, 56, 18, −4, 0, 0} |
| Example MQ.140 | {0, 2, −8, 58, 15, −3, 0, 0} |
| Example MQ.141 | {0, 2, −8, 59, 14, −3, 0, 0} |
| Example MQ.142 | {0, 2, −9, 56, 18, −3, 0, 0} |
| Example MQ.143 | {0, 2, −9, 57, 17, −3, 0, 0} |
| Example MQ.144 | {0, 2, −9, 58, 16, −3, 0, 0} |
| Example MQ.145 | {0, 2, −10, 55, 20, −3, 0, 0} |
| Example MQ.146 | {0, 2, −10, 56, 19, −3, 0, 0} |
| Example MQ.147 | {0, 3, −6, 58, 14, −5, 0, 0} |
| Example MQ.148 | {0, 3, −6, 59, 13, −5, 0, 0} |
| Example MQ.149 | {0, 3, −7, 54, 20, −6, 0, 0} |
| Example MQ.150 | {0, 3, −7, 55, 19, −6, 0, 0} |
| Example MQ.151 | {0, 3, −7, 57, 16, −5, 0, 0} |
| Example MQ.152 | {0, 3, −7, 58, 15, −5, 0, 0} |
| Example MQ.153 | {0, 3, −7, 60, 12, −4, 0, 0} |
| Example MQ.154 | {0, 3, −8, 56, 18, −5, 0, 0} |
| Example MQ.155 | {0, 3, −8, 57, 17, −5, 0, 0} |
| Example MQ.156 | {0, 3, −8, 59, 14, −4, 0, 0} |
| Example MQ.157 | {0, 3, −8, 60, 13, −4, 0, 0} |
| Example MQ.158 | {0, 3, −9, 55, 20, −5, 0, 0} |
| Example MQ.159 | {0, 3, −9, 56, 19, −5, 0, 0} |
| Example MQ.160 | {0, 3, −9, 57, 17, −4, 0, 0} |
| Example MQ.161 | {0, 3, −9, 58, 16, −4, 0, 0} |
| Example MQ.162 | {0, 3, −9, 59, 15, −4, 0, 0} |
| Example MQ.163 | {0, 3, −10, 55, 20, −4, 0, 0} |
| Example MQ.164 | {0, 3, −10, 56, 19, −4, 0, 0} |
| Example MQ.165 | {0, 3, −10, 57, 18, −4, 0, 0} |
| Example MQ.166 | {0, 4, −7, 58, 15, −6, 0, 0} |
| Example MQ.167 | {0, 4, −7, 59, 14, −6, 0, 0} |
| Example MQ.168 | {0, 4, −7, 60, 12, −5, 0, 0} |
| Example MQ.169 | {0, 4, −8, 54, 21, −7, 0, 0} |
| Example MQ.170 | {0, 4, −8, 55, 20, −7, 0, 0} |
| Example MQ.171 | {0, 4, −8, 57, 17, −6, 0, 0} |
| Example MQ.172 | {0, 4, −8, 58, 16, −6, 0, 0} |
| Example MQ.173 | {0, 4, −8, 60, 13, −5, 0, 0} |
| Example MQ.174 | {0, 4, −8, 61, 12, −5, 0, 0} |
| Example MQ.175 | {0, 4, −9, 55, 20, −6, 0, 0} |
| Example MQ.176 | {0, 4, −9, 56, 19, −6, 0, 0} |
| Example MQ.177 | {0, 4, −9, 57, 18, −6, 0, 0} |
| Example MQ.178 | {0, 4, −9, 58, 16, −5, 0, 0} |
| Example MQ.179 | {0, 4, −9, 59, 15, −5, 0, 0} |
| Example MQ.180 | {0, 4, −9, 60, 14, −5, 0, 0} |
| Example MQ.181 | {0, 4, −10, 57, 18, −5, 0, 0} |
| Example MQ.182 | {0, 4, −10, 58, 17, −5, 0, 0} |
| Example MQ.183 | {0, 5, −8, 57, 17, −7, 0, 0} |
| Example MQ.184 | {0, 5, −8, 58, 16, −7, 0, 0} |
| Example MQ.185 | {0, 5, −8, 60, 13, −6, 0, 0} |
| Example MQ.186 | {0, 5, −8, 61, 12, −6, 0, 0} |
| Example MQ.187 | {0, 5, −9, 56, 19, −7, 0, 0} |
| Example MQ.188 | {0, 5, −9, 57, 18, −7, 0, 0} |
| Example MQ.189 | {0, 5, −9, 60, 14, −6, 0, 0} |
| Example MQ.190 | {0, 6, −8, 61, 12, −7, 0, 0} |
| Example MQ.191 | {0, 6, −9, 58, 17, −8, 0, 0} |

A specific interpolation filter 106 may work well for certain types of video content. In some embodiments, the interpolation filter(s) 104 are adaptively chosen. So, different interpolation filter(s) 104 are allowed for different video sequences. In addition, the characteristics of the pixels along the horizontal lines and the vertical lines may be very different. Hence, particular embodiments employ separate interpolation filters 106 in the horizontal and vertical directions, and the separate horizontal and vertical interpolation filters 106 are not necessarily the same, depending upon the video content. For example, a coding unit or a picture with mostly horizontal detail could use a stronger vertical interpolation filter 106, etc. The interpolation filter 106 selection information can be signaled explicitly, or derived implicitly, at sequence, picture, slice or even CU level.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method for encoding or decoding video content, the method comprising:
    receiving a plurality of full-pel pixel values;
    determining a set of coefficients for an interpolation filter to interpolate a sub-pel pixel value for a motion compensation operation;
    assigning a first coefficient to weight a first full-pel pixel value in the plurality of full-pel pixel values in a first operation in the interpolation filter, the first coefficient having a value of −1;
    assigning a second coefficient to weight a second full-pel pixel value in the plurality of full-pel pixel values in a second operation in the interpolation filter, the second coefficient having a value of 4;
    assigning a third coefficient to weight a third full-pel pixel value in the plurality of full-pel pixel values in a third operation in the interpolation filter, the third coefficient having a value of −10;
    assigning a fourth coefficient to weight a fourth full-pel pixel value in the plurality of full-pel pixel values in a fourth operation in the interpolation filter, the fourth coefficient having a value of 58;
    assigning a fifth coefficient to weight a fifth full-pel pixel value in the plurality of full-pel pixel values in a fifth operation in the interpolation filter, the fifth coefficient having a value of 17;
    assigning a sixth coefficient to weight a sixth full-pel pixel value in the plurality of full-pel pixel values in a sixth operation in the interpolation filter, the sixth coefficient having a value of −5;
    assigning a seventh coefficient to weight a seventh full-pel pixel value in the plurality of full-pel pixel values in a seventh operation in the interpolation filter, the seventh coefficient having a value of 1;
    determining the sub-pel pixel value from the first operation, the second operation, the third operation, the fourth operation, the fifth operation, the sixth operation, and the seventh operation; and
    outputting the interpolated sub-pel pixel value for use in the motion compensation operation.

2. The method of claim 1, wherein an eighth coefficient has a zero value and corresponds to an eighth full-pel pixel value in the plurality of pixel values.

3. The method of claim 2, wherein an eighth operation to weight the eighth full-pel pixel value with the eighth coefficient is not performed due to the eighth coefficient value being the zero value.

4. A non-transitory computer-readable storage medium containing instructions for encoding or decoding video content, the instructions for controlling a computer system to be operable to:
    receive a plurality of full-pel pixel values;
    determine a set of coefficients for an interpolation filter to interpolate a sub-pel pixel value for a motion compensation operation;
    assign a first coefficient to weight a first full-pel pixel value in the plurality of full-pel pixel values in a first operation in the interpolation filter, the first coefficient having a value of −1;
    assign a second coefficient to weight a second full-pel pixel value in the plurality of full-pel pixel values in a second operation in the interpolation filter, the second coefficient having a value of 4;
    assign a third coefficient to weight a third full-pel pixel value in the plurality of full-pel pixel values in a third operation in the interpolation filter, the third coefficient having a value of −10;
    assign a fourth coefficient to weight a fourth full-pel pixel value in the plurality of full-pel pixel values in a fourth operation in the interpolation filter, the fourth coefficient having a value of 58;
    assign a fifth coefficient to weight a fifth full-pel pixel value in the plurality of full-pel pixel values in a fifth operation in the interpolation filter, the fifth coefficient having a value of 17;
    assign a sixth coefficient to weight a sixth full-pel pixel value in the plurality of full-pel pixel values in a sixth operation in the interpolation filter, the sixth coefficient having a value of −5;
    assign a seventh coefficient to weight a seventh full-pel pixel value in the plurality of full-pel pixel values in a seventh operation in the interpolation filter, the seventh coefficient having a value of 1;
    determine the sub-pel pixel value from the first operation, the second operation, the third operation, the fourth operation, the fifth operation, the sixth operation, and the seventh operation; and
    output the interpolated sub-pel pixel value for use in the motion compensation operation.

5. The non-transitory computer-readable storage medium of claim 4, wherein an eighth coefficient has a zero value and corresponds to an eighth full-pel pixel value in the plurality of pixel values.

6. The non-transitory computer-readable storage medium of claim 5, wherein an eighth operation to weight the eighth full-pel pixel value with the eighth coefficient is not performed due to the eighth coefficient value being the zero value.

7. An apparatus configured to encode or decode video content, the apparatus comprising:
   one or more computer processors; and
   a computer-readable storage medium comprising instructions for controlling the one or more computer processors to be operable to:
   receive a plurality of full-pel pixel values;
   determine a set of coefficients for an interpolation filter to interpolate a sub-pel pixel value for a motion compensation operation;
   assign a first coefficient to weight a first full-pel pixel value in the plurality of full-pel pixel values in a first operation in the interpolation filter, the first coefficient having a value of −1;
   assign a second coefficient to weight a second full-pel pixel value in the plurality of full-pel pixel values in a second operation in the interpolation filter, the second coefficient having a value of 4;
   assign a third coefficient to weight a third full-pel pixel value in the plurality of full-pel pixel values in a third operation in the interpolation filter, the third coefficient having a value of −10;
   assign a fourth coefficient to weight a fourth full-pel pixel value in the plurality of full-pel pixel values in a fourth operation in the interpolation filter, the fourth coefficient having a value of 58;
   assign a fifth coefficient to weight a fifth full-pel pixel value in the plurality of full-pel pixel values in a fifth operation in the interpolation filter, the fifth coefficient having a value of 17;
   assign a sixth coefficient to weight a sixth full-pel pixel value in the plurality of full-pel pixel values in a sixth operation in the interpolation filter, the sixth coefficient having a value of −5;
   assign a seventh coefficient to weight a seventh full-pel pixel value in the plurality of full-pel pixel values in a seventh operation in the interpolation filter, the seventh coefficient having a value of 1;
   determine the sub-pel pixel value from the first operation, the second operation, the third operation, the fourth operation, the fifth operation, the sixth operation, and the seventh operation; and
   output the interpolated sub-pel pixel value for use in the motion compensation operation.

8. The apparatus of claim 7, wherein an eighth coefficient has a zero value and corresponds to an eighth full-pel pixel value in the plurality of pixel values.

9. The apparatus of claim 8, wherein an eighth operation to weight the eighth full-pel pixel value with the eighth coefficient is not performed due to the eighth coefficient value being the zero value.

10. A method for encoding or decoding video content, the method comprising:
    receiving a plurality of full-pel pixel values;
    determining a set of coefficients for an interpolation filter to interpolate a sub-pel pixel value for a motion compensation operation;
    assigning a first coefficient to weight a first full-pel pixel value in the plurality of full-pel pixel values in a first operation in the interpolation filter, the first coefficient having a value of 1;
    assigning a second coefficient to weight a second full-pel pixel value in the plurality of full-pel pixel values in a second operation in the interpolation filter, the second coefficient having a value of −5;
    assigning a third coefficient to weight a third full-pel pixel value in the plurality of full-pel pixel values in a third operation in the interpolation filter, the third coefficient having a value of 17;
    assigning a fourth coefficient to weight a fourth full-pel pixel value in the plurality of full-pel pixel values in a fourth operation in the interpolation filter, the fourth coefficient having a value of 58;
    assigning a fifth coefficient to weight a fifth full-pel pixel value in the plurality of full-pel pixel values in a fifth operation in the interpolation filter, the fifth coefficient having a value of −10;
    assigning a sixth coefficient to weight a sixth full-pel pixel value in the plurality of full-pel pixel values in a sixth operation in the interpolation filter, the sixth coefficient having a value of 4;
    assigning a seventh coefficient to weight a seventh full-pel pixel value in the plurality of full-pel pixel values in a seventh operation in the interpolation filter, the seventh coefficient having a value of −1;
    determining the sub-pel pixel value from the first operation, the second operation, the third operation, the fourth operation, the fifth operation, the sixth operation, and the seventh operation; and
    outputting the interpolated sub-pel pixel value for use in the motion compensation operation.

11. The method of claim 10, wherein an eighth coefficient has a zero value and corresponds to an eighth full-pel pixel value in the plurality of pixel values.

12. The method of claim 11, wherein an eighth operation to weight the eighth full-pel pixel value with the eighth coefficient is not performed due to the eighth coefficient value being the zero value.

13. A non-transitory computer-readable storage medium containing instructions for encoding or decoding video content, the instructions for controlling a computer system to be operable to:
    receive a plurality of full-pel pixel values;
    determine a set of coefficients for an interpolation filter to interpolate a sub-pel pixel value for a motion compensation operation;
    assign a first coefficient to weight a first full-pel pixel value in the plurality of full-pel pixel values in a first operation in the interpolation filter, the first coefficient having a value of 1;
    assign a second coefficient to weight a second full-pel pixel value in the plurality of full-pel pixel values in a second operation in the interpolation filter, the second coefficient having a value of −5;
    assign a third coefficient to weight a third full-pel pixel value in the plurality of full-pel pixel values in a third operation in the interpolation filter, the third coefficient having a value of 17;
    assign a fourth coefficient to weight a fourth full-pel pixel value in the plurality of full-pel pixel values in a fourth operation in the interpolation filter, the fourth coefficient having a value of 58;
    assign a fifth coefficient to weight a fifth full-pel pixel value in the plurality of full-pel pixel values in a fifth operation in the interpolation filter, the fifth coefficient having a value of −10;
    assign a sixth coefficient to weight a sixth full-pel pixel value in the plurality of full-pel pixel values in a sixth operation in the interpolation filter, the sixth coefficient having a value of 4;
    assign a seventh coefficient to weight a seventh full-pel pixel value in the plurality of full-pel pixel values in a seventh operation in the interpolation filter, the seventh coefficient having a value of −1;

determine the sub-pel pixel value from the first operation, the second operation, the third operation, the fourth operation, the fifth operation, the sixth operation, and the seventh operation; and output the interpolated sub-pel pixel value for use in the motion compensation operation.

14. The non-transitory computer-readable storage medium of claim 13, wherein an eighth coefficient has a zero value and corresponds to an eighth full-pel pixel value in the plurality of pixel values.

15. The non-transitory computer-readable storage medium of claim 14, wherein an eighth operation to weight the eighth full-pel pixel value with the eighth coefficient is not performed due to the eighth coefficient value being the zero value.

16. An apparatus configured to encode or decode video content, the apparatus comprising:

one or more computer processors; and a computer-readable storage medium comprising instructions for controlling the one or more computer processors to be operable to:

receive a plurality of full-pel pixel values;

determine a set of coefficients for an interpolation filter to interpolate a sub-pel pixel value for a motion compensation operation;

assign a first coefficient to weight a first full-pel pixel value in the plurality of full-pel pixel values in a first operation in the interpolation filter, the first coefficient having a value of 1;

assign a second coefficient to weight a second full-pel pixel value in the plurality of full-pel pixel values in a second operation in the interpolation filter, the second coefficient having a value of −5;

assign a third coefficient to weight a third full-pel pixel value in the plurality of full-pel pixel values in a third operation in the interpolation filter, the third coefficient having a value of 17;

assign a fourth coefficient to weight a fourth full-pel pixel value in the plurality of full-pel pixel values in a fourth operation in the interpolation filter, the fourth coefficient having a value of 58;

assign a fifth coefficient to weight a fifth full-pel pixel value in the plurality of full-pel pixel values in a fifth operation in the interpolation filter, the fifth coefficient having a value of −10;

assign a sixth coefficient to weight a sixth full-pel pixel value in the plurality of full-pel pixel values in a sixth operation in the interpolation filter, the sixth coefficient having a value of 4;

assign a seventh coefficient to weight a seventh full-pel pixel value in the plurality of full-pel pixel values in a seventh operation in the interpolation filter, the seventh coefficient having a value of −1;

determine the sub-pel pixel value from the first operation, the second operation, the third operation, the fourth operation, the fifth operation, the sixth operation, and the seventh operation; and output the interpolated sub-pel pixel value for use in the motion compensation operation.

17. The apparatus of claim 16, wherein an eighth coefficient has a zero value and corresponds to an eighth full-pel pixel value in the plurality of pixel values.

18. The apparatus of claim 17, wherein an eighth operation to weight the eighth full-pel pixel value with the eighth coefficient is not performed due to the eighth coefficient value being the zero value.

19. A method for encoding or decoding video content, the method comprising:

receiving a plurality of full-pel pixel values;

determining a set of coefficients for an interpolation filter to interpolate a sub-pel pixel value for a motion compensation operation;

assigning a first coefficient to weight a first full-pel pixel value in the plurality of full-pel pixel values in a first operation in the interpolation filter, the first coefficient having a value of −1;

assigning a second coefficient to weight a second full-pel pixel value in the plurality of full-pel pixel values in a second operation in the interpolation filter, the second coefficient having a value of 3;

assigning a third coefficient to weight a third full-pel pixel value in the plurality of full-pel pixel values in a third operation in the interpolation filter, the third coefficient having a value of −8;

assigning a fourth coefficient to weight a fourth full-pel pixel value in the plurality of full-pel pixel values in a fourth operation in the interpolation filter, the fourth coefficient having a value of 60;

assigning a fifth coefficient to weight a fifth full-pel pixel value in the plurality of full-pel pixel values in a fifth operation in the interpolation filter, the fifth coefficient having a value of 13;

assigning a sixth coefficient to weight a sixth full-pel pixel value in the plurality of full-pel pixel values in a sixth operation in the interpolation filter, the sixth coefficient having a value of −4;

assigning a seventh coefficient to weight a seventh full-pel pixel value in the plurality of full-pel pixel values in a seventh operation in the interpolation filter, the seventh coefficient having a value of 1;

determining an interpolated sub-pel pixel value from the first operation, the second operation, the third operation, the fourth operation, the fifth operation, the sixth operation, and the seventh operation; and outputting the interpolated sub-pel pixel value for use in the motion compensation operation.

20. The method of claim 19, wherein an eighth coefficient has a zero value and corresponds to an eighth full-pel pixel value in the plurality of pixel values.

21. The method of claim 20, wherein an eighth operation to weight the eighth full-pel pixel value with the eighth coefficient is not performed due to the eighth coefficient value being the zero value.

22. A non-transitory computer-readable storage medium containing instructions for controlling a computer system to be operable to:

receive a plurality of full-pel pixel values;

determine a set of coefficients for an interpolation filter to interpolate a sub-pel pixel value for a motion compensation operation;

assign a first coefficient to weight a first full-pel pixel value in the plurality of full-pel pixel values in a first operation in the interpolation filter, the first coefficient having a value of −1;

assign a second coefficient to weight a second full-pel pixel value in the plurality of full-pel pixel values in a second operation in the interpolation filter, the second coefficient having a value of 3;

assign a third coefficient to weight a third full-pel pixel value in the plurality of full-pel pixel values in a third operation in the interpolation filter, the third coefficient having a value of −8;

assign a fourth coefficient to weight a fourth full-pel pixel value in the plurality of full-pel pixel values in a fourth operation in the interpolation filter, the fourth coefficient having a value of 60;

assign a fifth coefficient to weight a fifth full-pel pixel value in the plurality of full-pel pixel values in a fifth operation in the interpolation filter, the fifth coefficient having a value of 13;

assign a sixth coefficient to weight a sixth full-pel pixel value in the plurality of full-pel pixel values in a sixth operation in the interpolation filter, the sixth coefficient having a value of −4;

assign a seventh coefficient to weight a seventh full-pel pixel value in the plurality of full-pel pixel values in a seventh operation in the interpolation filter, the seventh coefficient having a value of 1;

determine an interpolated sub-pel pixel value from the first operation, the second operation, the third operation, the fourth operation, the fifth operation, the sixth operation, and the seventh operation; and output the interpolated sub-pel pixel value for use in the motion compensation operation.

23. The non-transitory computer-readable storage medium of claim 22, wherein an eighth coefficient has a zero value and corresponds to an eighth full-pel pixel value in the plurality of pixel values.

24. The non-transitory computer-readable storage medium of claim 23, wherein an eighth operation to weight the eighth full-pel pixel value with the eighth coefficient is not performed due to the eighth coefficient value being the zero value.

25. An apparatus configured to encode or decode video content, the apparatus comprising:
one or more computer processors; and
a computer-readable storage medium comprising instructions for controlling the one or more computer processors to be operable to:
receive a plurality of full-pel pixel values;
determine a set of coefficients for an interpolation filter to interpolate a sub-pel pixel value for a motion compensation operation;
assign a first coefficient to weight a first full-pel pixel value in the plurality of full-pel pixel values in a first operation in the interpolation filter, the first coefficient having a value of −1;
assign a second coefficient to weight a second full-pel pixel value in the plurality of full-pel pixel values in a second operation in the interpolation filter, the second coefficient having a value of 3;
assign a third coefficient to weight a third full-pel pixel value in the plurality of full-pel pixel values in a third operation in the interpolation filter, the third coefficient having a value of −8;
assign a fourth coefficient to weight a fourth full-pel pixel value in the plurality of full-pel pixel values in a fourth operation in the interpolation filter, the fourth coefficient having a value of 60;
assign a fifth coefficient to weight a fifth full-pel pixel value in the plurality of full-pel pixel values in a fifth operation in the interpolation filter, the fifth coefficient having a value of 13;

assign a sixth coefficient to weight a sixth full-pel pixel value in the plurality of full-pel pixel values in a sixth operation in the interpolation filter, the sixth coefficient having a value of −4;

assign a seventh coefficient to weight a seventh full-pel pixel value in the plurality of full-pel pixel values in a seventh operation in the interpolation filter, the seventh coefficient having a value of 1;

determine an interpolated sub-pel pixel value from the first operation, the second operation, the third operation, the fourth operation, the fifth operation, the sixth operation, and the seventh operation; and output the interpolated sub-pel pixel value for use in the motion compensation operation.

26. The apparatus of claim 25, wherein an eighth coefficient has a zero value and corresponds to an eighth full-pel pixel value in the plurality of pixel values.

27. The apparatus of claim 26, wherein an eighth operation to weight the eighth full-pel pixel value with the eighth coefficient is not performed due to the eighth coefficient value being the zero value.

28. A method for encoding or decoding video content, the method comprising:
receiving a plurality of full-pel pixel values;
determining a set of coefficients for an interpolation filter to interpolate a sub-pel pixel value for a motion compensation operation;
assigning a first coefficient to weight a first full-pel pixel value in the plurality of full-pel pixel values in a first operation in the interpolation filter, the first coefficient having a value of 1;
assigning a second coefficient to weight a second full-pel pixel value in the plurality of full-pel pixel values in a second operation in the interpolation filter, the second coefficient having a value of −4;
assigning a third coefficient to weight a third full-pel pixel value in the plurality of full-pel pixel values in a third operation in the interpolation filter, the third coefficient having a value of 13;
assigning a fourth coefficient to weight a fourth full-pel pixel value in the plurality of full-pel pixel values in a fourth operation in the interpolation filter, the fourth coefficient having a value of 60;
assigning a fifth coefficient to weight a fifth full-pel pixel value in the plurality of full-pel pixel values in a fifth operation in the interpolation filter, the fifth coefficient having a value of −8;
assigning a sixth coefficient to weight a sixth full-pel pixel value in the plurality of full-pel pixel values in a sixth operation in the interpolation filter, the sixth coefficient having a value of 3;
assigning a seventh coefficient to weight a seventh full-pel pixel value in the plurality of full-pel pixel values in a seventh operation in the interpolation filter, the seventh coefficient having a value of −1;
determining an interpolated sub-pel pixel value from the first operation, the second operation, the third operation, the fourth operation, the fifth operation, the sixth operation, and the seventh operation;
outputting the interpolated sub-pel pixel value for use in the motion compensation operation.

29. The method of claim 28, wherein an eighth coefficient has a zero value and corresponds to an eighth full-pel pixel value in the plurality of pixel values.

30. The method of claim 29, wherein an eighth operation to weight the eighth full-pel pixel value with the eighth coefficient is not performed due to the eighth coefficient value being the zero value.

31. A non-transitory computer-readable storage medium containing instructions for encoding or decoding video content, the instructions for controlling a computer system to be operable to:

receive a plurality of full-pel pixel values;

determine a set of coefficients for an interpolation filter to interpolate a sub-pel pixel value for a motion compensation operation;

assign a first coefficient to weight a first full-pel pixel value in the plurality of full-pel pixel values in a first operation in the interpolation filter, the first coefficient having a value of 1;

assign a second coefficient to weight a second full-pel pixel value in the plurality of full-pel pixel values in a second operation in the interpolation filter, the second coefficient having a value of −4;

assign a third coefficient to weight a third full-pel pixel value in the plurality of full-pel pixel values in a third operation in the interpolation filter, the third coefficient having a value of 13;

assign a fourth coefficient to weight a fourth full-pel pixel value in the plurality of full-pel pixel values in a fourth operation in the interpolation filter, the fourth coefficient having a value of 60;

assign a fifth coefficient to weight a fifth full-pel pixel value in the plurality of full-pel pixel values in a fifth operation in the interpolation filter, the fifth coefficient having a value of −8;

assign a sixth coefficient to weight a sixth full-pel pixel value in the plurality of full-pel pixel values in a sixth operation in the interpolation filter, the sixth coefficient having a value of 3;

assign a seventh coefficient to weight a seventh full-pel pixel value in the plurality of full-pel pixel values in a seventh operation in the interpolation filter, the seventh coefficient having a value of −1;

determine an interpolated sub-pel pixel value from the first operation, the second operation, the third operation, the fourth operation, the fifth operation, the sixth operation, and the seventh operation;

output the interpolated sub-pel pixel value for use in the motion compensation operation.

32. The non-transitory computer-readable storage medium of claim 31, wherein an eighth coefficient has a zero value and corresponds to an eighth full-pel pixel value in the plurality of pixel values.

33. The non-transitory computer-readable storage medium of claim 32, wherein an eighth operation to weight the eighth full-pel pixel value with the eighth coefficient is not performed due to the eighth coefficient value being the zero value.

34. An apparatus configured to encode or decode video content, the apparatus comprising:

one or more computer processors; and a computer-readable storage medium comprising instructions for controlling the one or more computer processors to be operable to:

receive a plurality of full-pel pixel values;

determine a set of coefficients for an interpolation filter to interpolate a sub-pel pixel value for a motion compensation operation;

assign a first coefficient to weight a first full-pel pixel value in the plurality of full-pel pixel values in a first operation in the interpolation filter, the first coefficient having a value of 1;

assign a second coefficient to weight a second full-pel pixel value in the plurality of full-pel pixel values in a second operation in the interpolation filter, the second coefficient having a value of −4;

assign a third coefficient to weight a third full-pel pixel value in the plurality of full-pel pixel values in a third operation in the interpolation filter, the third coefficient having a value of 13;

assign a fourth coefficient to weight a fourth full-pel pixel value in the plurality of full-pel pixel values in a fourth operation in the interpolation filter, the fourth coefficient having a value of 60;

assign a fifth coefficient to weight a fifth full-pel pixel value in the plurality of full-pel pixel values in a fifth operation in the interpolation filter, the fifth coefficient having a value of −8;

assign a sixth coefficient to weight a sixth full-pel pixel value in the plurality of full-pel pixel values in a sixth operation in the interpolation filter, the sixth coefficient having a value of 3;

assign a seventh coefficient to weight a seventh full-pel pixel value in the plurality of full-pel pixel values in a seventh operation in the interpolation filter, the seventh coefficient having a value of −1;

determine an interpolated sub-pel pixel value from the first operation, the second operation, the third operation, the fourth operation, the fifth operation, the sixth operation, and the seventh operation;

output the interpolated sub-pel pixel value for use in the motion compensation operation.

35. The apparatus of claim 34, wherein an eighth coefficient has a zero value and corresponds to an eighth full-pel pixel value in the plurality of pixel values.

36. The apparatus of claim 35, wherein an eighth operation to weight the eighth full-pel pixel value with the eighth coefficient is not performed due to the eighth coefficient value being the zero value.

* * * * *

UNITED STATES PATENT AND TRADEMARK OFFICE
CERTIFICATE OF CORRECTION

PATENT NO. : 9,036,706 B2
APPLICATION NO. : 13/415918
DATED : May 19, 2015
INVENTOR(S) : Jian Lou et al.

It is certified that error appears in the above-identified patent and that said Letters Patent is hereby corrected as shown below:

Title Page, Item (73) Assignee name should be --Google Technology Holdings LLC--

Signed and Sealed this
Twenty-third Day of February, 2016

Michelle K. Lee
*Director of the United States Patent and Trademark Office*